A. CLOUTIER.
SURFACE MEASURING MACHINE.
APPLICATION FILED NOV. 21, 1919.
1,413,517.
Patented Apr. 18, 1922.
2 SHEETS—SHEET 1.
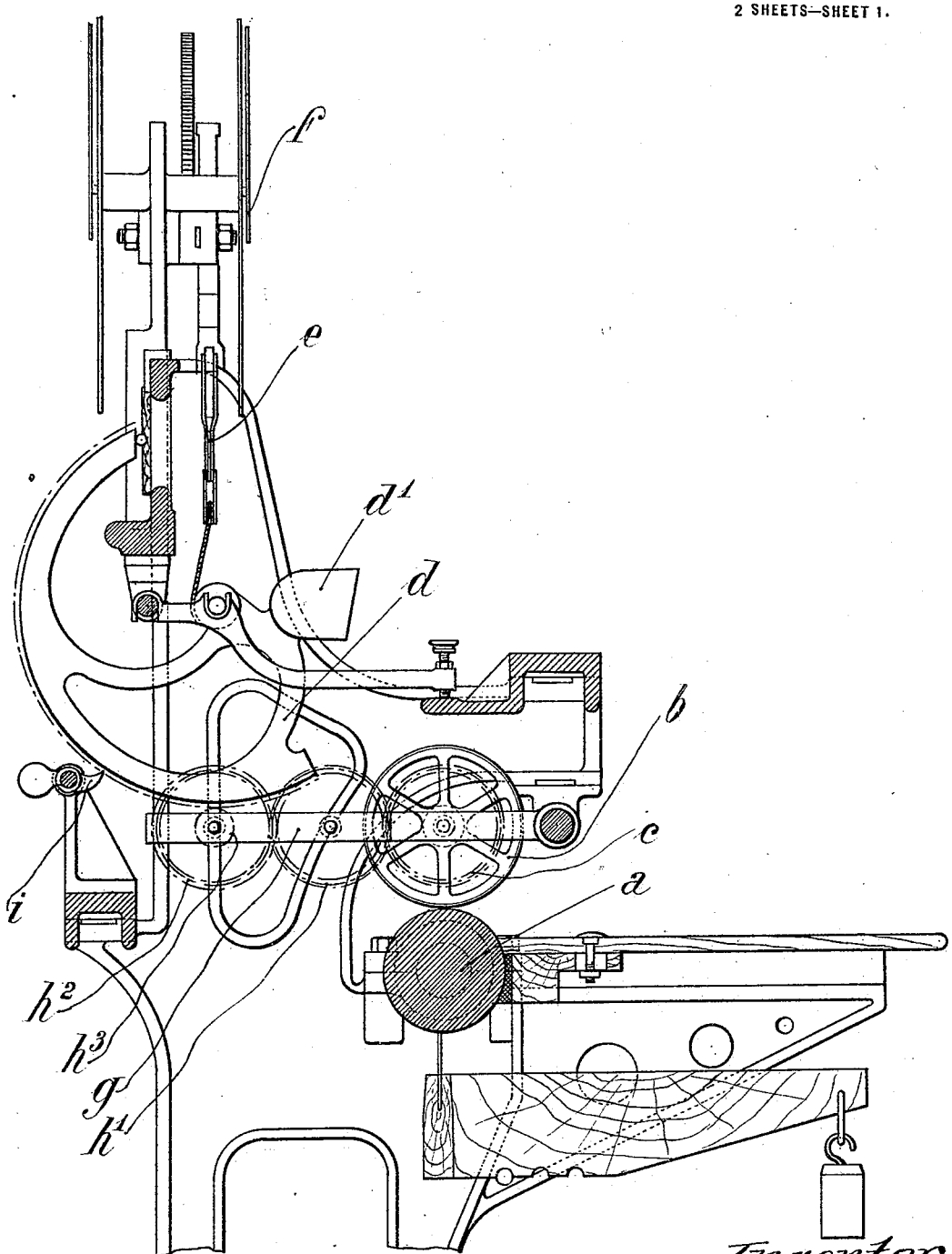
Witnesses
Inventor
André Cloutier
by
Attorney

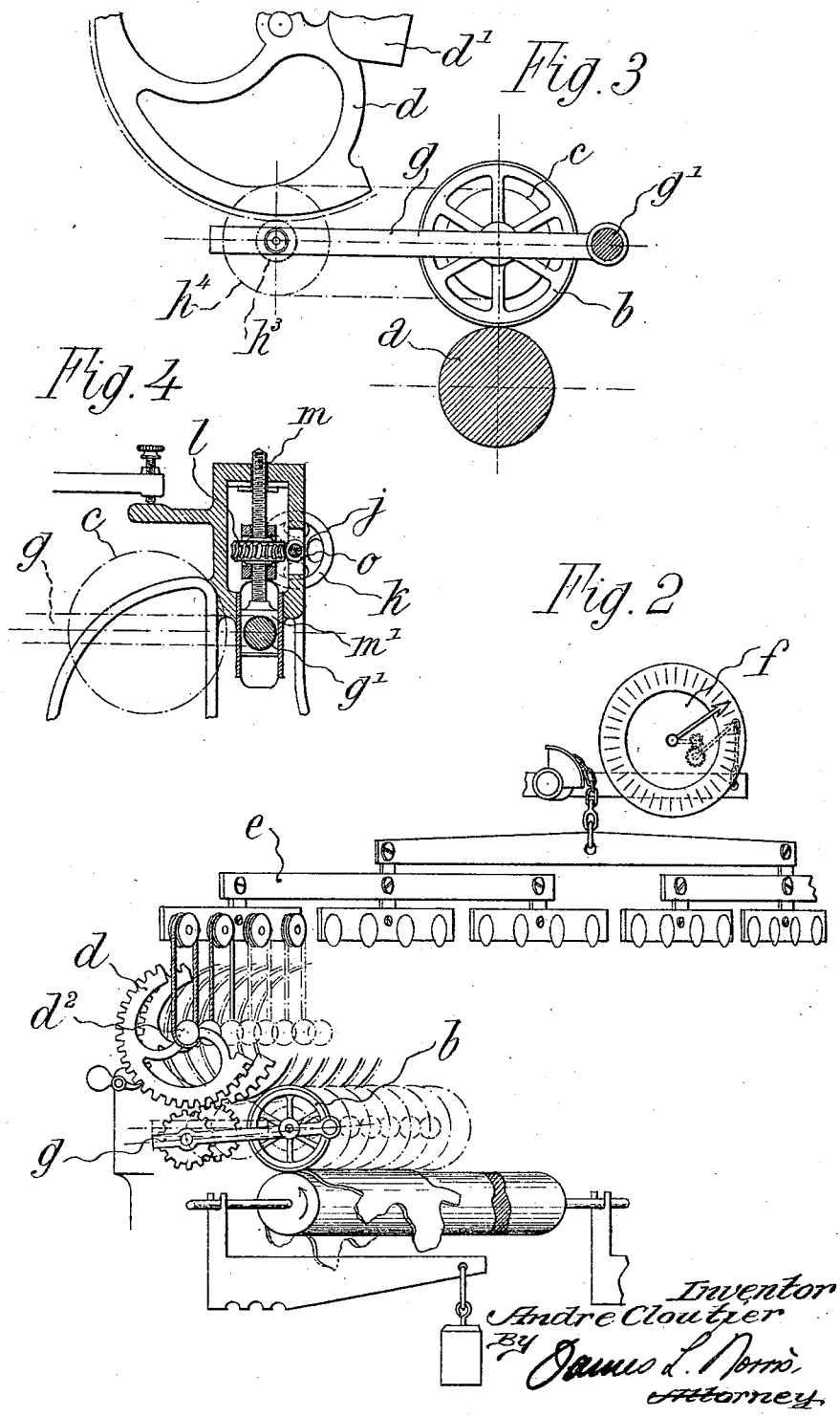

UNITED STATES PATENT OFFICE.

ANDRÉ CLOUTIER, OF PARIS, FRANCE, ASSIGNOR TO THE SOCIETY ETABLISSEMENTS GEORGES LUTZ G. KREMPP, OF PARIS, FRANCE.

SURFACE-MEASURING MACHINE.

1,413,517.  Specification of Letters Patent.  Patented Apr. 18, 1922.

Application filed November 21, 1919. Serial No. 339,764.

*To all whom it may concern:*

Be it known that I, ANDRÉ CLOUTIER, citizen of the French Republic, residing at Paris, France, have invented certain new and useful Improvements in Surface-Measuring Machines, of which the following is a specification.

This invention relates to surface measuring machines suitably for the measuring of the surface of supple objects, such as hides, animal skins and the like.

It relates to a definite kind of such machines, of which the following is a description. In such machines there is a drum, and rollers bearing against said drum along a generating line thereof. Every one of these rollers can move independently and will be lifted independently by the hide passing between the said drum and the said rollers. Toothed pinions are fixed to every roller, and toothed sectors are arranged above said pinions so that when the roller is lifted, the pinion engages with the corresponding sector. A set of levers is connected with the toothed sectors, and acts in such peculiar way on a main lever that its displacement will be in proportion to the angular displacements of every one of said toothed sectors, and more particularly in proportion to their sum so that the position of the main lever indicates the sum of the displacements of the sectors. Said rollers being equidistant, the position of the main lever will show the area of the surface of the skin which may be read on a graduated indicator in connection with said main lever.

The functioning of this kind of machines may change, or may be even totally impaired, when the object to be measured is of little thickness. The main object of the present invention is to remove this disadvantage.

The invention consists mainly in providing means which will cause the uplift movement of the rollers, (which results when the skin passes underneath them), to be amplified. The uplift movement of the toothed pinion (necessary in order to obtain the engagement of the respective sector) will thus amount to an always sufficient magnitude.

The invention comprises, in addition to this main feature, certain other arrangements hereinafter referred to. The following complementary description, taken in connection with the accompanying drawing gives an example of carrying the present invention into effect.

Figure 1 of said drawing shows a machine of the above described kind, partially in cross section, established according to the present invention.

Fig. 2 shows the same machine in front view with parts broken off.

Fig. 3 shows schematically in cross-section a detail of an alternative embodiment of the invention.

Fig. 4 shows in cross-section a detail of another alternative embodiment of the invention.

The machine comprises as known a suitable frame in which is journalled a drum $a$ having a horizontal axle. It is usual to arrange the said drum so, that its height may be adjusted at will, for instance, by means of a pair of devices, in order to adapt its position to the average thickness of the skins to be measured.

A series of rollers $b$ (every one having a toothed pinion $c$ fastened to it and being independent in its movements),—is so arranged above said drum, that the rollers bear against the drum $a$ along a generating line thereof. Toothed sectors $d$ are journalled about a common axle $d^2$, in a number equal to that of the rollers $b$.

Said sectors are arranged so that they act by means of a set of levers $e$ on a main lever (which itself acts upon an indicator $f$), the whole being arranged in such a manner that by the partial rotation of any sector, a displacement, (proportional to the angular displacement of such sector) will occur in the main lever.

The arrangement is such that the movements which are thus imparted to the main lever are added up, so that the latter will be displaced in proportion to the sum of the individual displacements of the sectors.

Now, according to the present invention, the toothed pinions $c$ are not arranged in such a way that they may engage directly with their corresponding toothed sectors, but by means of a set of gears $h^1$, $h^2$, $h^3$.

Each of the rollers $b$ with its pinion $c$ is journalled on an axle carried by an amplifying lever $g$.

The levers $g$ are all hinged on a common axle $g^1$. The said gears $h^1$, $h^2$, $h^3$ are also journalled on said amplifying levers $g$ and placed farther away from the axle $g^1$ of said levers $g$ than the rollers $b$. The pinions $h^1$ are constantly engaged with the pinions $c$, the motion of which is forwarded by a certain number of intermediate pinions to a pinion $h^3$, which has to mesh with the sectors $d$ when the roller $b$ is through the hide moved off the drum $a$, thus causing the amplifying lever $g$ to oscillate.

The sectors $d$ are—as usual—retained by means of a series of pawls $i$ in the positions wherein they have been brought. Counterweights $d^1$ are provided on the sectors so as to bring them back to their normal position when the pawls $i$ are thrown out of action.

The invention is not limited to the way of carrying it into effect which has been hereinbefore described.

The rotation of the pinions $c$ may for instance be transmitted to the driven pinion $h^3$ by means of chains, or even belts and any modification of the means for obtaining the amplification may be used in the scope of the claims, as shown in Fig. 3. In this arrangement, chain sprocket wheels $c$, $h^4$ are used, and in case of the usage of belts, analogous pulleys are substituted. Said sprocket wheels or pulleys are connected by a chain or a belt. The function of the amplifying levers $g$ is the same as before.

Another special feature of the present improvement which may be utilized in addition to the principal feature consists in placing the adjustable journalling device (which permits the regulation of the height of the drum $a$ according to the thickness of the skin), not on the drum itself, as it is usual, but on the common axle $g^1$ of the amplifying levers $g$, this combination adding to the simplicity and dependability of the machine as the said axle will have a less important weight than the drum itself.

Such adjustable journalling device is shown in Fig. 4. It is used in order to lift or lower at will a common axle $g^1$ on which the amplifying levers are hinged.

A shaft $j$ passing from the right hand extremity of the body of the machine to its left hand extremity, is journalled near each end in suitable bearings A hand wheel $k$ and worm $o$ are mounted on the shaft and the worm meshes with worm wheels $l$ maintained axially by proper parts of the body and held radially by threaded vertical rods $m$. The rods $m$ are provided with head parts $m^1$ into which are fastened the ends of the common axle $g^1$. It will be understood that upon rotating the hand wheel $k$ in one or the other direction the rods $m$ will be simultaneously lifted or lowered and thus displace the common axle $g^1$. Other means analogous to those described may be utilized for the same purpose.

I claim:

1. A machine for measuring the surface of supple flat objects,—comprising a frame,— a horizontal drum journalled therein—a set of rollers bearing upon the said drum along a generating line thereof, a set of levers whereon said rollers are journalled,—a set of driven toothed pinions on said levers,— means for transmitting the rotation of the rollers to the driven toothed pinions,—a set of toothed sectors pivoted loosely about an axle parallel to the drum,—means for transmitting the uplift movement of the rollers to the driven toothed pinions in an amplified way—and means of mechanically adding up the angular displacements of said sectors.

2. A machine for measuring the surface of supple flat objects,—comprising a frame,— a horizontal drum journalled therein,—a set of amplifying levers, a common axle parallel to the drum on which said levers are hinged,—rollers journalled on said levers at a distance from the said common axle, said rollers bearing on said drum along a generating line thereof,—a set of driven toothed pinions journalled on said levers at a greater distance from the common axle than that of the rollers, means for transmitting the rotation from the rollers to the driven toothed pinions,—a set of toothed sectors pivoted loosely about a common axle parallel to the drum—and means of mechanically adding up the angular displacements of said sectors.

3. A machine for measuring the surface of supple flat objects, comprising a frame,— a horizontal drum, journalled therein,— a set of amplifying levers, a common axle parallel to the drum,—rollers journalled on said levers at a distance from the said common axle, said rollers bearing on said drum along a generating line thereof,—a set of driven toothed pinions journalled on said levers at a greater distance from the common axle than that of the rollers,—sets of toothed wheels transmitting the rotation from the rollers to the driven toothed pinions,—a set of toothed sectors pivoted loosely about a common axle parallel to the drum— and means of mechanically adding up the angular displacements of said sectors.

4. A machine for measuring the surface of supple flat objects,—comprising a frame,— a horizontal drum journalled therein,—a set of amplifying levers, a common axle parallel to the drum on which the said levers are hinged, means for adjusting the height of said common axle above the drum,— rollers journalled on said levers at a distance from said common axle, said rollers bearing on said drum along a generating line thereof,—a set of driven toothed pinions journalled on said levers at a greater distance from the common axle than that of the rollers,—sets of toothed wheels transmitting the rotation from the rollers to the driven toothed pinions,—a set of toothed sectors pivoted loosely about a common axle parallel to the drum, and means of mechanically adding up the angular displacements of said sectors.

5. A machine for measuring the surface of supple flat objects,—comprising a frame,— a horizontal drum journalled therein,—a set of amplifying levers, a common axle parallel to the drum, on which axle the amplifying levers are hinged,—adjusting means arranged on said common axle in order to adjust its height at will,—rollers journalled on said amplifying levers at a distance from said common axle, said rollers bearing on said drum along a generating line thereof,— a set of driven toothed pinions journalled on said amplifying levers at a greater distance from the common axle that that of the rollers,—sets of toothed wheels transmitting the rotation from the rollers to the driven toothed pinions,—a set of toothed sectors pivoted loosely about a common axle parallel to the drum and means of mechanically adding up the angular displacements of said sectors.

In testimony whereof I have hereunto set my hand in presence of two subscribing witnesses.

ANDRÉ CLOUTIER.

Witnesses:
E. JULLIEZ,
CHAS. P. PRESSLY.